United States Patent
Yan

(10) Patent No.: US 10,795,465 B2
(45) Date of Patent: Oct. 6, 2020

(54) TOUCH CONTROL UNIT, ELECTROCHROMATIC FORCE SENSING TOUCH PAD, INPUT METHOD THEREOF, AND DISPLAY PANEL

(71) Applicants: CHENGDU BOE OPTOELECTRONICS TECHNOLOGY CO., LTD., Chengdu, Sichuan (CN); BOE TECHNOLOGY GROUP CO., LTD., Beijing (CN)

(72) Inventor: Shaning Yan, Beijing (CN)

(73) Assignees: CHENGDU BOE OPTOELECTRONICS TECHNOLOGY CO., LTD., Chengdu, Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 9 days.

(21) Appl. No.: 16/411,387

(22) Filed: May 14, 2019

(65) Prior Publication Data
US 2020/0089346 A1 Mar. 19, 2020

(30) Foreign Application Priority Data
Sep. 14, 2018 (CN) .......................... 2018 1 1074236

(51) Int. Cl.
G06F 3/0354 (2013.01)
G06F 3/041 (2006.01)
G02F 1/15 (2019.01)
G06F 3/042 (2006.01)

(52) U.S. Cl.
CPC .......... G06F 3/03547 (2013.01); G02F 1/15 (2013.01); G06F 3/04164 (2019.05)

(58) Field of Classification Search
CPC .............. G06F 3/0414; G06F 3/04142; G06F 3/04144; G06F 3/0883; G06F 3/03547; G02F 1/15–163; G02F 2001/1502–164
See application file for complete search history.

(56) References Cited

U.S. PATENT DOCUMENTS

| 10,037,098 B2* | 7/2018 | Bao ....................... G06F 3/0416 |
| 2006/0071819 A1* | 4/2006 | Johnson ............... H01H 13/702 341/15 |
| 2017/0131818 A1* | 5/2017 | Chang .................... G06F 3/044 |

* cited by examiner

*Primary Examiner* — Laurence J Lee

(57) ABSTRACT

A touch control unit, a touch pad, an input method and a display panel are disclosed. The touch control unit includes a substrate, a first electrode layer formed on the substrate, an electrochromic film formed on the first electrode layer, a second electrode unit formed on the electrochromic film and a piezoelectric film unit disposed corresponding to the second electrode unit. At least a portion of the piezoelectric film unit is in direct contact with the second electrode unit. The second electrode unit is transparent, and a projection area of the piezoelectric film unit on the substrate is smaller than a projection area of the second electrode unit on the substrate.

20 Claims, 2 Drawing Sheets

TOUCH CONTROL UNIT, ELECTROCHROMATIC FORCE SENSING TOUCH PAD, INPUT METHOD THEREOF, AND DISPLAY PANEL

TECHNICAL FIELD

The present disclosure relates to a touch control unit, a touch pad, an input method thereof and a display panel.

BACKGROUND

In the existing market, electronic handwriting boards have been widely used due to their low power consumption, reusability, etc. In the prior art, electronic handwriting boards mainly realize the handwriting function through a touch pad, and electronic ink touch pad of electrophoretic display technology and Cholesteric liquid crystal display technology are mainly used.

However, with the continuous development of display technology, people are pursuing the thinner and lighter display device, and at the same time, they also require the touch pad to be as thin and portable as possible.

SUMMARY

At a first aspect, an embodiment of the present disclosure provides a touch control unit, the touch control unit comprises a substrate, a first electrode layer formed on the substrate, an electrochromic film formed on the first electrode layer, a second electrode unit formed on the electrochromic film and a piezoelectric film unit disposed corresponding to the second electrode unit, and at least a portion of the piezoelectric film unit is in direct contact with the second electrode unit, the second electrode unit is transparent, and a projection area of the piezoelectric film unit on the substrate is smaller than a projection area of the second electrode unit on the substrate.

For example, in the touch control unit according to the embodiment of the present disclosure, the piezoelectric film unit is made of an opaque material, and the piezoelectric film unit is located at an edge of a corresponding second electrode unit.

For example, in the touch control unit according to the embodiment of the present disclosure, a surface of the piezoelectric film unit facing the substrate and parallel to the substrate all contacts the second electrode unit.

For example, in the touch control unit according to the embodiment of the present disclosure, a groove is formed at the edge of the second electrode unit, and the piezoelectric film unit is located in the groove of the corresponding second electrode unit.

For example, in the touch control unit according to the embodiment of the present disclosure, the piezoelectric film unit is disposed above the second electrode unit.

For example, in the touch control unit according to the embodiment of the present disclosure, the piezoelectric film unit and the second electrode unit are disposed in an identical layer, a surface of the piezoelectric film unit facing the substrate and a surface of the second electrode unit facing the substrate are coplanar, and a side surface of the piezoelectric film unit completely contacts the second electrode unit.

For example, in the touch control unit according to the embodiment of the present disclosure, the touch control unit further includes a transparent planarization layer formed on a side of the second electrode unit opposite to the substrate and in a region not covered by the piezoelectric film unit, and flush with the piezoelectric film unit.

For example, in the touch control unit according to the embodiment of the present disclosure, the substrate and the first electrode layer are transparent.

For example, in the touch control unit according to the embodiment of the present disclosure, the electrochromic film is a poly (aniline-co-N-(4-sulfophenyl) aniline) XV2O5 nano composite film, wherein X is set in a numerical range in which the electrochromic film exhibits black color.

For example, in the touch control unit according to the embodiment of the present disclosure, the substrate and the first electrode layer are opaque.

For example, in the touch unit according to the embodiment of the present disclosure, the electrochromic film is a poly (aniline-co-N-(4-sulfophenyl) aniline) XV2O5 nano composite film, wherein X is set in a numerical range in which the electrochromic film exhibits a color that contrasts with black.

At a second aspect, an embodiment of the present disclosure provides a touch pad including a plurality of touch control units according to the first aspect, an insulating layer is disposed between the second electrode units of adjacent touch control units, between the piezoelectric film units of the adjacent touch control units and between the second electrode unit and the piezoelectric film unit of the adjacent touch control units.

For example, in the touch pad according to the embodiment of the present disclosure, the substrate is an integrated structure, and at least one of the first electrode layer and the electrochromic film of the plurality of touch units is formed into an integrated structure.

For example, in the touch pad according to the embodiment of the present disclosure, the touch pad further includes a cover plate arranged on a touch control side of the second electrode unit and the piezoelectric film unit of the plurality of touch control units.

For example, in the touch pad according to the embodiment of the present disclosure, the substrate and the first electrode layer are transparent, and the touch pad further comprises a backlight source or a reflective sheet positioned on a side of the substrate away from the cover plate.

For example, in the touch pad according to the embodiment of the present disclosure, the piezoelectric film unit is disposed above the second electrode unit, the touch pad further comprises a transparent planarization layer formed on a side of the second electrode unit opposite to the substrate and in a region not covered by the piezoelectric film unit, and being flush with the piezoelectric film unit, the cover plate is arranged on a side of the transparent planarization layer opposite to the substrate.

For example, in the touch pad according to the embodiment of the present disclosure, a projection area of the second electrode unit on the substrate is smaller than a contact area between a touch object and the touch pad.

At a third aspect, an embodiment of the present disclosure provides a display panel with a touch function, the display panel includes the touch pad according to the second aspect and arranged on a display side of the display panel, the substrate and the first electrode lay are transparent; and each of the plurality of touch control units corresponds to at least one sub-pixel of the display panel.

At a fourth aspect, an embodiment of the present disclosure provides the input method of the touch pad according to the second aspect which includes: forming an electrical signal by the piezoelectric film unit in response to an input of a touch object; forming a voltage difference between the second electrode unit and the first electrode layer in response to the electrical signal, so that the electrochromic film changes color to realize a dark state.

For example, the input method according to the embodiment of the present disclosure further includes applying a voltage with a polarity opposite to a polarity of the voltage difference to the first electrode layer, so that the electrochromic film returns to an original state.

BRIEF DESCRIPTION OF THE DRAWINGS

In order to more clearly explain the technical scheme of the embodiments of the present disclosure, the following will briefly introduce the drawings needed in the description of the embodiments of the present disclosure. Obviously, the drawings in the following description are only some embodiments of the present disclosure. For those of ordinary skill in the art, other drawings can be obtained according to these drawings without creative labor.

DETAILED DESCRIPTION

Figure 1:
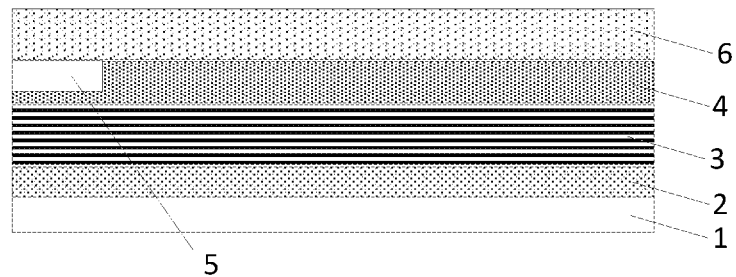
FIG. 1 shows a cross-sectional view of a touch control unit of a touch pad according to an embodiment of the present disclosure.

Embodiments of the present disclosure are described in detail below, examples of which are illustrated in the accompanying drawings, wherein the same or similar reference numerals refer to the same or similar elements or elements having the same or similar functions throughout. The embodiments described below with reference to the accompanying drawings are exemplary and are only for the purpose of explaining the present disclosure and should not be construed as limiting the embodiments of the present disclosure.

In the description of this specification, the description referring to the terms "one embodiment," "some embodiments," "examples," "specific examples," or "some examples" and the like means that a specific feature, structure, material, or characteristic described in connection with the embodiment or example is included in at least one embodiment or example of the present disclosure. In this specification, the schematic representation of the above-mentioned terms does not necessarily refer to the same embodiment or example. Moreover, the specific features, structures, materials, or characteristics described may be combined in any one or more embodiments or examples in a suitable manner. In addition, those skilled in the art can combine and combine different embodiments or examples described in this specification and features of different embodiments or examples without contradicting each other.

Furthermore, the terms "first" and "second" are used for descriptive purposes only and cannot be understood as indicating or implying relative importance or implicitly indicating the number of technical features indicated. Thus, features defining "first" and "second" may explicitly or implicitly include at least one of the features. In the description of the present disclosure, the meaning of "plural" is two or more, unless otherwise specifically defined.

For the touch pad, electrophoretic particles or Cholesteric liquid crystal molecules with different colors at a touch position are rearranged by identifying the touch position and changing the electric field at the touch position, so that different color being different with colors at other positions is displayed at the touch position and the required electronic ink display effect is obtained.

In order to solve a problem of thick and heavy traditional touch pad, people are constantly looking for a touch pad that can replace the traditional touch pad or has better performance. For example, a new material that can realize touch control function are adopted. Piezoelectric materials have positive piezoelectric effect and inverse piezoelectric effect. Under the action of mechanical force, the piezoelectric material will deform and charged particles may relatively shift, thus positive and negative bound charge will appear on the crystal surface. The electric charge generated by the piezoelectric material is stored by a capacitor or a microbattery, and then a stable current or voltage can be output through a designed control circuit. Therefore, the piezoelectric materials have the advantages of simple structure, no electromagnetic interference, no heat generation, easy fabrication, easy realization of miniaturization in structure, integration, low cost and the like, and are widely used.

For example, an embodiment of the present disclosure provides a touch control unit, which comprises a substrate; a first electrode layer formed on the substrate; an electrochromic film formed on the first electrode layer; a second electrode unit formed on the electrochromic film; and a piezoelectric film unit disposed corresponding to the second electrode unit and at least partially in direct contact with the second electrode unit, the second electrode unit is transparent, and a projection area of the piezoelectric film unit on the substrate is smaller than a projection area of the second electrode unit on the substrate.

As shown in FIG. 1, an embodiment of the present disclosure provides a touch control unit including: a substrate 1; a first electrode layer 2 formed on the substrate 1; an electrochromic film 3 formed on the first electrode layer 2; a second electrode unit 4 arranged on the electrochromic film 3, wherein the second electrode unit 4 is transparent; a piezoelectric film unit 5 formed corresponding to the second electrode unit 4, the piezoelectric film unit 5 is configured to not completely block light entering the second electrode unit 4 from the touch side of the touch pad.

For example, the piezoelectric film unit is made of an opaque material, and the piezoelectric film unit is located at an edge of the corresponding second electrode unit.

For example, a surface of the piezoelectric film unit facing the substrate and parallel to the substrate all contacts the second electrode unit.

For example, the piezoelectric film unit 5 may be configured to partially cover the second electrode unit 4. By sensing the pressure of an external medium applied to the touch control unit through the piezoelectric film unit 5, the piezoelectric film unit 5 deforms under the action of an external force and generates a current, causing the second electrode unit 4 connected to the piezoelectric film unit 5 to have a positive voltage or a negative voltage, and meanwhile applying a 0V voltage to the first electrode layer 2, so that a forward or reverse voltage difference is generated between the second electrode unit 4 and the first electrode layer 2, the voltage difference causes the electrochromic film 3 to change color, and the touch pad realizes dark state display, thereby forming a handwriting effect. According to the embodiment, the piezoelectric effect of the piezoelectric material is adopted to generate electric charges and the electrochromic film is changed in color so as to realize the display effect, and the function of the touch pad can be realized; and meanwhile, the touch pad has the advantages of simple structure, green and pollution-free, and the like, and meets the requirement of people on the thinner and lighter touch pad.

Figure 2:
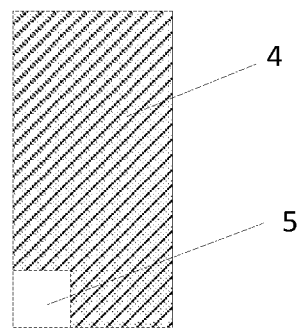
FIG. 2 shows a top view of a second electrode unit according to an embodiment of the present disclosure.

Considering the aperture ratio of the touch pad, as shown in FIG. 2, each piezoelectric film unit 5 is disposed at an edge of the corresponding second electrode unit 4, for example, a corner of the second electrode unit 4, thereby maximizing the aperture ratio of the entire touch pad and effectively improving the display efficiency of the handwriting pad. Alternatively, the piezoelectric film unit 5 may also be disposed at a region between both ends of one side edge, and its orthographic projection area on the substrate is smaller than an orthographic projection area of the second electrode unit on the substrate.

Alternatively, the piezoelectric film unit 5 may also be disposed in a region except for the edge of each second electrode unit, as long as the function of touch input can be realized, and the embodiment of the present disclosure is not limited thereto.

Alternatively, a top view shows that the second electrode unit and the piezoelectric film unit are in a rectangular shape. It should be noted that the planar shapes of the second electrode unit and the piezoelectric film unit may also be circular, polygonal, irregular patterns, etc. The embodiments of the present disclosure are not limited to this, as long as the input display of the touch object can be achieved.

For example, in order to improve the identifiability and sensitivity of the touch pad, the orthographic projection area of the second electrode unit 4 on the substrate is smaller than an area of a contacting region of the touch object with the touch pad. That is, the area of the second electrode unit 4 is smaller than an area of a handwriting pen tip or an area of a finger tip, and the smaller the area of the second motor unit 4, the higher the identifiability and sensitivity of the touch pad.

For example, as shown in FIG. 1, a groove is formed at the edge of each second electrode unit 4; and the piezoelectric film unit 5 is located in the groove of the corresponding second electrode unit 4.

Figure 3:
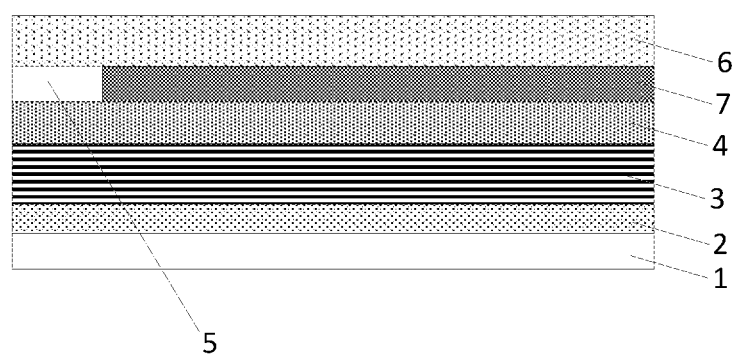
FIG. 3 shows a cross-sectional view of a touch control unit of a touch pad according to another embodiment of the present disclosure.

Alternatively, as shown in FIG. 3, the piezoelectric film unit 5 is located above the edge of the corresponding second electrode unit 4 towards the cover plate 6 side; and the touch pad further includes a transparent planarization layer 7 formed on a side of the second electrode unit 4 opposite to the substrate and in a region not covered by the piezoelectric film unit 5, flush with the piezoelectric film unit 5.

Alternatively, the piezoelectric film unit may also be disposed in the same layer as the second electrode unit, with the difference from the embodiment of FIG. 1 that the surface of the piezoelectric film unit facing the substrate and the surface of the second electrode unit facing the substrate are coplanar, and a side surface of the piezoelectric film unit completely contacts the second electrode unit.

For example, the substrate and the first electrode layer of the touch pad may be transparent. That is, light incident on the touch pad from the substrate can pass through the substrate and the first electrode layer.

When the substrate and the first electrode layer of the touch pad are transparent, the electrochromic film is a poly (aniline-co-N-(4-sulfophenyl) aniline)$_x$V$_2$O$_5$ nano composite film, wherein X may be set in a numerical range in which the electrochromic film exhibits black, brown and the other colors which can form contrast with the transparent state and display the inputting under the transparent state. For example, X may be set in a numerical range in which the electrochromic film exhibits black color, but the embodiments of the present disclosure are not limited thereto.

The electrochromic film can be controlled to present different colors by adjusting the stoichiometric amount of the electrochromic film. When the substrate and the first electrode layer are transparent, the electrochromic film can present black color and obtain a good display effect. However, the electrochromic film may also present brown color and the like which form a strong contrast with the transparent state. Therefore, a person skilled in the art may set the specific stoichiometric amount of the chemical formula according to the specific application, for example, black color can be realized.

For example, the substrate and the first electrode layer may be opaque. In other words, a background color of the touch pad is black, so in order to improve the display effect of the touch pad, the first electrode layer also has a reflection function for reflecting the incident ambient light for the user to watch. Further, in order to improve the contrast between handwriting and background color, the electrochromic film is a poly (aniline-co-N-(4-sulfophenyl) aniline)$_x$V$_2$O$_5$ nano composite film, wherein X is set in a numerical range in which the electrochromic film exhibits a color with contrast with black, for example, blue, red, green and the other colors with large contrast with black. When the electrochromic film presents a color with greater contrast with black, the more suitable it is for users to write, the more it can meet the needs of users. The contrast here means that when this color and black are displayed in different areas at the same time, black and the content displayed in this color can be distinguished.

An embodiment of the present disclosure also provides a touch pad, which comprises a plurality of touch control units as described above, wherein the second electrode units of adjacent touch control units are separated by an insulating layer and the piezoelectric film units of adjacent touch control units are separated by an insulating layer, that is, the second electrode units of adjacent touch control units are insulated from each other, and the adjacent piezoelectric film units are insulated from each other.

For example, the plurality of touch control units may be arranged in an array.

For example, the touch pad may include a touch control unit defining layer, which is used to define at least the second electrode unit and the piezoelectric film unit of different touch control units.

Alternatively, for a plurality of touch control units of the touch pad, at least one of the structural layers except for the second electrode unit and the piezoelectric film unit may be an integral structure, for example, the substrate is integral, or the first electrode layer is integral, or the electrochromic thin film may be integral, or these structural layers are all integral. The embodiments of the present disclosure are not limited thereto.

Alternatively, the first electrode layer and/or the electrochromic film of adjacent touch control units may be insulated from each other, and the embodiments of the present disclosure are not limited thereto.

For example, as shown in FIG. 1, the touch pad of the embodiment of the present disclosure may further include a transparent cover plate 6 formed on the second electrode unit 4 and the piezoelectric film unit 5, and the transparent cover plate 6 is disposed on a touch side of the second electrode unit and the piezoelectric film unit of the plurality of touch control units.

Alternatively, in order to further improve the display effect of the touch pad, the touch pad further comprises a backlight source or a reflective sheet on a side of the substrate away from the cover plate. When the touch pad comprises a backlight source, the backlight source provides backlight to the touch pad, so that handwriting written on the touch pad is clearer, the contrast ratio is higher, and the touch pad is suitable to be viewed for a long time. When the touch pad comprises a reflective sheet, natural light entering the touch pad from the cover plate side is reflected by the reflective sheet, so that light rays of the touch pad are softer, and visual fatigue caused by long-time viewing can be relieved.

Alternatively, the piezoelectric film unit is disposed above the second electrode unit, and the touch pad further includes a transparent planarization layer formed on a side of the second electrode unit opposite to the substrate and in a region not covered by the piezoelectric film unit, flush with the piezoelectric film unit, wherein the cover plate is disposed on a side of the transparent planarization layer opposite to the substrate.

Corresponding to the touch pad provided in the above embodiment, an embodiment of the present application also provides a handwriting input method by using the touch pad. Since the handwriting input method provided in the embodiment of the present application corresponds to the touch pad provided in the above embodiment, the above embodiment is also applicable to the handwriting input method provided in the present embodiment and will not be described in detail in this embodiment.

Figure 4:
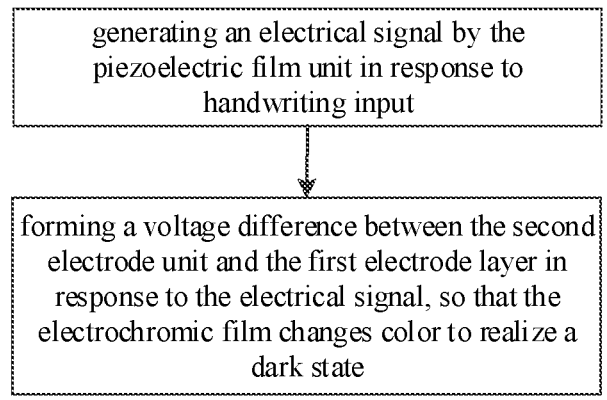
FIG. 4 shows a flowchart of a handwriting input method of a touch pad according to an embodiment of the present disclosure.

As shown in FIG. 4, a handwriting input method using the touch pad as mentioned above includes: generating an electrical signal by the piezoelectric film unit in response to handwriting input; forming a voltage difference between the second electrode unit and the first electrode layer in response to the electrical signal, so that the electrochromic film changes color to realize a dark state. According to the embodiment, current is generated by applying mechanical force to the piezoelectric film, so that the electrodes at the two sides of the electrochromic film generate voltage difference to cause the electrochromic film to change color, thereby realizing dark state display of the handwriting pad and meeting handwriting requirement of an user.

Alternatively, the method further includes applying a voltage whose polarity is opposite to the voltage difference to the first electrode layer, so that the electrochromic film returns to an original state. That is, when the handwriting input is performed, current is generated by applying mechanical force to the piezoelectric film unit, so that the electrodes at two sides of the electrochromic film generate voltage difference to cause the electrochromic film to change color, thereby realizing dark state display of the touch pad; when writing is finished, by adjusting the voltage of the first electrode layer, if the voltage difference between the second electrode unit and the first electrode layer is a positive voltage, a reverse negative voltage whose value is equal to a value of the voltage difference is applied to the first electrode layer, and vice versa; if the voltage difference is a negative voltage, a positive voltage is applied to the first electrode layer to reset the electrochromic film, so that the electrochromic film 3 fades, returns to the original state, and writing can continue.

Figure 5:
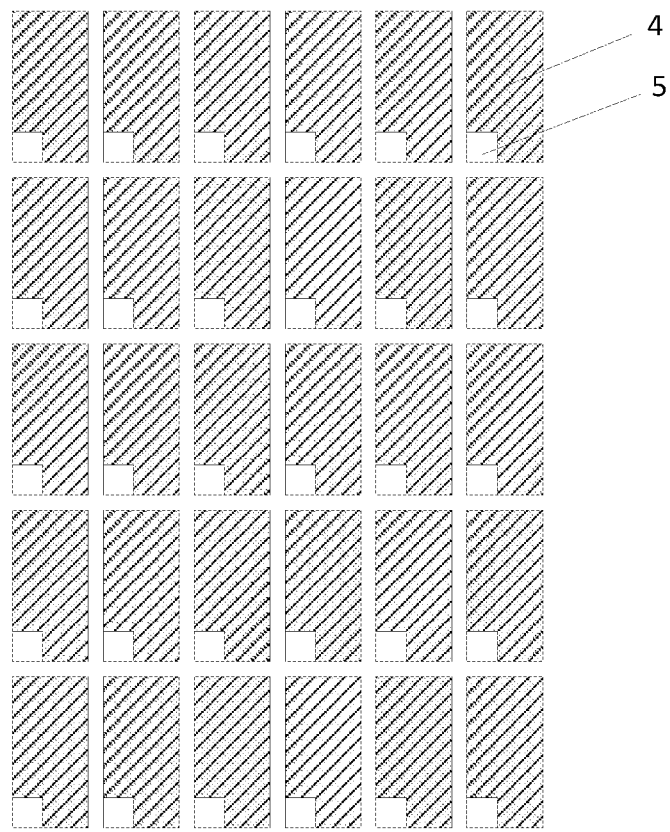
FIG. 5 shows a schematic structural diagram of a touch pad according to an embodiment of the present disclosure.

Another embodiment of the present disclosure provides a display panel with a touch control function, which comprises the touch pad as mentioned above, wherein the touch pad is arranged on a display side of the display panel, and the substrate and the first electrode layer are transparent; and each of the plurality of touch control units corresponds to at least one sub-pixel of the display panel and may correspond to one, two or more sub-pixels, or the plurality of touch control units may correspond to the sub-pixels of the display panel in a one-to-one correspondent relationship, and the correspondence between the touch control units and the sub-pixels may be the correspondence between the second electrode unit 4 and the sub-pixels of the display panel. When the substrate and the first electrode layer are transparent, the touch pad may be applied to any display panel with touch control function, such as an LCD panel or an OLED panel. As shown in FIG. 5, the second electrode unit 4 corresponds to a position of a sub-pixel of the display panel, and the touch pad realizes touch control function in the display panel.

According to the touch control unit, the touch pad, the input method thereof and the display panel provided by the embodiments of the disclosure, aiming at the problem of thick and heavy current touch pad, the touch pad of the present disclosure generates current by applying mechanical force to the piezoelectric film unit, so that the electrodes at the two sides of the electrochromic film generate voltage difference to cause the electrochromic film to change color, thereby realizing dark state display of the touch pad, improving the thick and heavy structure of the touch pad, and making the touch pad as light and portable as possible.

The above description is only a specific embodiment of the embodiment of the present disclosure, but the protection scope of the embodiment of the present disclosure is not limited to this. Any person familiar with the technical field can easily think of changes or substitutions within the technical scope disclosed by the embodiment of the present disclosure, and should be covered within the protection scope of the embodiment of the present disclosure. Therefore, the protection scope of the embodiments of the present disclosure should be based on the protection scope of the claims.

For this disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged or reduced, i.e., these drawings are not drawn to actual scale.

(3) In case of no conflict, features in one embodiment or in different embodiments can be combined.

This application claims priority to Chinese Patent Application No. 201811074236.4 filed on Sep. 14, 2018, the disclosure of which is incorporated herein by reference in its entirety as part of this application.

What is claimed is:

1. A touch control unit, comprising:
   a substrate;
   a first electrode layer, formed on the substrate,
   an electrochromic film, formed on the first electrode layer,
   a second electrode unit, formed on the electrochromic film, and
   a piezoelectric film unit, disposed corresponding to the second electrode unit and at least a portion of the piezoelectric film unit being in direct contact with the second electrode unit,
   wherein the second electrode unit is transparent, and a projection area of the piezoelectric film unit on the substrate is smaller than a projection area of the second electrode unit on the substrate.

2. The touch control unit according to claim 1, wherein the piezoelectric film unit is made of an opaque material, and the piezoelectric film unit is located at an edge of a corresponding second electrode unit.

3. The touch control unit according to claim 2, wherein a surface of the piezoelectric film unit facing the substrate and parallel to the substrate all contacts the second electrode unit.

4. The touch control unit according to claim 3, wherein a groove is formed at the edge of the second electrode unit, and the piezoelectric film unit is located in the groove of the corresponding second electrode unit.

5. The touch control unit according to claim 3, wherein the piezoelectric film unit is disposed above the second electrode unit.

6. The touch control unit according to claim 5, further comprising:
a transparent planarization layer, formed on a side of the second electrode unit opposite to the substrate and in a region not covered by the piezoelectric film unit, and flush with the piezoelectric film unit.

7. The touch control unit according to claim 2, wherein the piezoelectric film unit and the second electrode unit are disposed in an identical layer, a surface of the piezoelectric film unit facing the substrate and a surface of the second electrode unit facing the substrate are coplanar, and a side surface of the piezoelectric film unit completely contacts the second electrode unit.

8. The touch control unit according to claim 1, wherein the substrate and the first electrode layer are transparent.

9. The touch control unit according to claim 8, wherein the electrochromic film is a poly (aniline-co-N-(4-sulfophenyl) aniline)$_x$V$_2$O$_5$ nano composite film, wherein X is set in a numerical range in which the electrochromic film exhibits black color.

10. The touch control unit according to claim 1, wherein the substrate and the first electrode layer are opaque.

11. The touch control unit according to claim 10, wherein the electrochromic film is a poly (aniline-co-N-(4-sulfophenyl) aniline)$_x$V$_2$O$_5$ nano composite film, wherein X is set in a numerical range in which the electrochromic film exhibits a color that contrasts with black.

12. A touch pad, comprising:
a plurality of touch control units according to claim 1,
wherein an insulating layer is disposed between the second electrode units of adjacent touch control units, between the piezoelectric film units of the adjacent touch control units and between the second electrode unit and the piezoelectric film unit of the adjacent touch control units.

13. The touch pad according to claim 12, wherein the substrate is an integrated structure, and at least one of the first electrode layer and the electrochromic film of the plurality of touch units is formed into an integrated structure.

14. The touch pad according to claim 13, further comprising:
a cover plate, arranged on a touch control side of the second electrode unit and the piezoelectric film unit of the plurality of touch control units.

15. The touch pad according to claim 14, wherein the substrate and the first electrode layer are transparent,
the touch pad further comprises:
a backlight source or a reflective sheet positioned on a side of the substrate away from the cover plate.

16. The touch pad according to claim 14, wherein the piezoelectric film unit is disposed above the second electrode unit,
the touch pad further comprises:
a transparent planarization layer, formed on a side of the second electrode unit opposite to the substrate and in a region not covered by the piezoelectric film unit, and being flush with the piezoelectric film unit,
wherein the cover plate is arranged on a side of the transparent planarization layer opposite to the substrate.

17. The touch pad according to claim 12, wherein a projection area of the second electrode unit on the substrate is smaller than a contact area between a touch object and the touch pad.

18. A display panel with touch function, comprising:
the touch pad according to claim 12, arranged on a display side of the display panel,
wherein the substrate and the first electrode layer are transparent; and
each of the plurality of touch control units corresponds to at least one sub-pixel of the display panel.

19. An input method of a touch pad according to claim 12, comprising:
forming an electrical signal by the piezoelectric film unit in response to an input of a touch object;
forming a voltage difference between the second electrode unit and the first electrode layer in response to the electrical signal, so that the electrochromic film changes color to realize a dark state.

20. The input method according to claim 19, further comprising:
applying a voltage with a polarity opposite to a polarity of the voltage difference to the first electrode layer, so that the electrochromic film returns to an original state.

* * * * *